(12) United States Patent
Sugizaki et al.

(10) Patent No.: US 10,632,830 B2
(45) Date of Patent: Apr. 28, 2020

(54) VEHICLE

(71) Applicant: HONDA MOTOR CO., LTD., Tokyo (JP)

(72) Inventors: Tetsuya Sugizaki, Wako (JP); Tomohiro Fukazu, Wako (JP); Noboru Fujiyoshi, Wako (JP); Rieko Koyama, Wako (JP); Kosuke Oguri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 15/426,970

(22) Filed: Feb. 7, 2017

(65) Prior Publication Data

US 2017/0232866 A1    Aug. 17, 2017

(30) Foreign Application Priority Data

Feb. 12, 2016    (JP) .................................. 2016-024979

(51) Int. Cl.
*B60K 6/28* (2007.10)
*B60K 6/26* (2007.10)
(Continued)

(52) U.S. Cl.
CPC .................. *B60K 6/28* (2013.01); *B60K 1/00* (2013.01); *B60K 1/04* (2013.01); *B60K 6/26* (2013.01); *B60L 3/0007* (2013.01); *B60L 3/0046* (2013.01); *B60L 11/1877* (2013.01); *B60K 7/0007* (2013.01); *B60K 11/02* (2013.01);
(Continued)

(58) Field of Classification Search
CPC .......... B60K 6/28; B60K 6/26; B60K 7/0007; B60L 3/0046; B60L 11/1877; B60L 11/1874; B60L 2240/545; B60Y 2200/92
See application file for complete search history.

(56) References Cited

U.S. PATENT DOCUMENTS

| 7,740,092 | B2* | 6/2010 | Bender | ................ | B60W 20/10 |
| | | | | | 180/65.29 |
| 8,932,769 | B2* | 1/2015 | Ohashi | .................. | B62D 25/20 |
| | | | | | 180/65.31 |

(Continued)

FOREIGN PATENT DOCUMENTS

| JP | 2001-514480 | 9/2001 |
| JP | 2005-349887 | 12/2005 |

(Continued)

OTHER PUBLICATIONS

Japanese Office Action for corresponding JP Application No. 2016-024979, dated Aug. 22, 2017 (w/ English machine translation).

*Primary Examiner* — Joseph M Rocca
*Assistant Examiner* — Marlon A Arce
(74) *Attorney, Agent, or Firm* — Mori & Ward, LLP

(57) ABSTRACT

A vehicle includes a motor, a high-voltage device, and a power converter. The motor moves the vehicle. The high-voltage device is disposed inside a vehicle cabin of the vehicle. The power converter is disposed outside the vehicle cabin. The power converter is connected to the motor and the high-voltage device to convert electric power output from the high-voltage device and to supply the converted electric power to the motor. The high-voltage device is arranged to be juxtaposed to the power converter along a front-rear direction of the vehicle.

16 Claims, 8 Drawing Sheets

(51) Int. Cl.
- *B60L 3/00* (2019.01)
- *B60L 11/18* (2006.01)
- *B60K 1/00* (2006.01)
- *B60K 1/04* (2019.01)
- *B60K 7/00* (2006.01)
- *B60K 11/02* (2006.01)
- *B60K 11/06* (2006.01)
- *B60K 17/356* (2006.01)

(52) U.S. Cl.
CPC ............ *B60K 11/06* (2013.01); *B60K 17/356* (2013.01); *B60K 2001/003* (2013.01); *B60K 2001/005* (2013.01); *B60K 2001/0438* (2013.01); *B60L 11/1874* (2013.01); *B60L 2240/545* (2013.01); *B60Y 2200/92* (2013.01); *B60Y 2400/61* (2013.01); *B60Y 2410/10* (2013.01); *B60Y 2410/115* (2013.01); *Y02T 10/646* (2013.01); *Y02T 10/705* (2013.01); *Y02T 10/7005* (2013.01); *Y10S 903/906* (2013.01); *Y10S 903/907* (2013.01); *Y10S 903/951* (2013.01)

(56) References Cited

U.S. PATENT DOCUMENTS

| | | | |
|---|---|---|---|
| 2014/0257613 A1* | 9/2014 | Tang | B60L 15/2036 701/22 |
| 2015/0115708 A1* | 4/2015 | Berry | B60L 11/005 307/10.1 |
| 2017/0217353 A1* | 8/2017 | Vander Pol | B60P 3/002 |
| 2017/0349226 A1* | 12/2017 | Oren | B62D 53/061 |
| 2018/0009401 A1* | 1/2018 | Miller | B60R 19/24 |
| 2018/0065490 A1* | 3/2018 | Goitsuka | B60K 6/46 |
| 2018/0065492 A1* | 3/2018 | Mastrandrea | B60L 11/185 |
| 2018/0086192 A1* | 3/2018 | Ishihara | B60K 1/04 |
| 2018/0111500 A1* | 4/2018 | Ogaki | B60L 11/1874 |
| 2018/0115272 A1* | 4/2018 | Kitaori | B60W 20/14 |

FOREIGN PATENT DOCUMENTS

| | | |
|---|---|---|
| JP | 2006-168600 | 6/2006 |
| JP | 2011-187702 | 9/2011 |
| JP | 2015-137001 | 7/2015 |

* cited by examiner

VEHICLE

CROSS-REFERENCE TO RELATED APPLICATIONS

The present application claims priority under 35 U.S.C. § 119 to Japanese Patent Application No. 2016-024979, filed Feb. 12, 2016, entitled "Vehicle." The contents of this application are incorporated herein by reference in their entirety.

BACKGROUND

Technical Field

The present invention relates to a vehicle.

Discussion of the Background

Vehicles such as hybrid vehicles and electric vehicles, which use motor power for propulsion, generally include a high-voltage device (for example, a high-voltage battery) that supplies electric power to a motor and a power converter (for example, an inverter) that performs electric power conversion when the electric power of the high-voltage device is supplied to the motor. Examples of known vehicles of this type include a vehicle in which the high-voltage device and the power converter are disposed inside a vehicle cabin (on a floor panel) and a vehicle in which the high-voltage device and the power converter are disposed outside a vehicle cabin (under a floor panel) (see, for example, Japanese Unexamined Patent Application Publication No. 2006-168600).

SUMMARY

According to one aspect of the present invention, a vehicle includes a motor, a high-voltage device, and a power converter. The high-voltage device supplies electric power to the motor. The power converter performs electric power conversion when the electric power of the high-voltage device is supplied to the motor. The high-voltage device is disposed inside a vehicle cabin. The power converter is disposed outside the vehicle cabin. The high-voltage device and the power converter are arranged next to each other in a front-rear direction.

According to an another of the present invention, a vehicle includes a motor, a high-voltage device, and a power converter. The motor moves the vehicle. The high-voltage device is disposed inside a vehicle cabin of the vehicle. The power converter is disposed outside the vehicle cabin. The power converter is connected to the motor and the high-voltage device to convert electric power output from the high-voltage device and to supply the converted electric power to the motor. The high-voltage device is arranged to be juxtaposed to the power converter along a front-rear direction of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
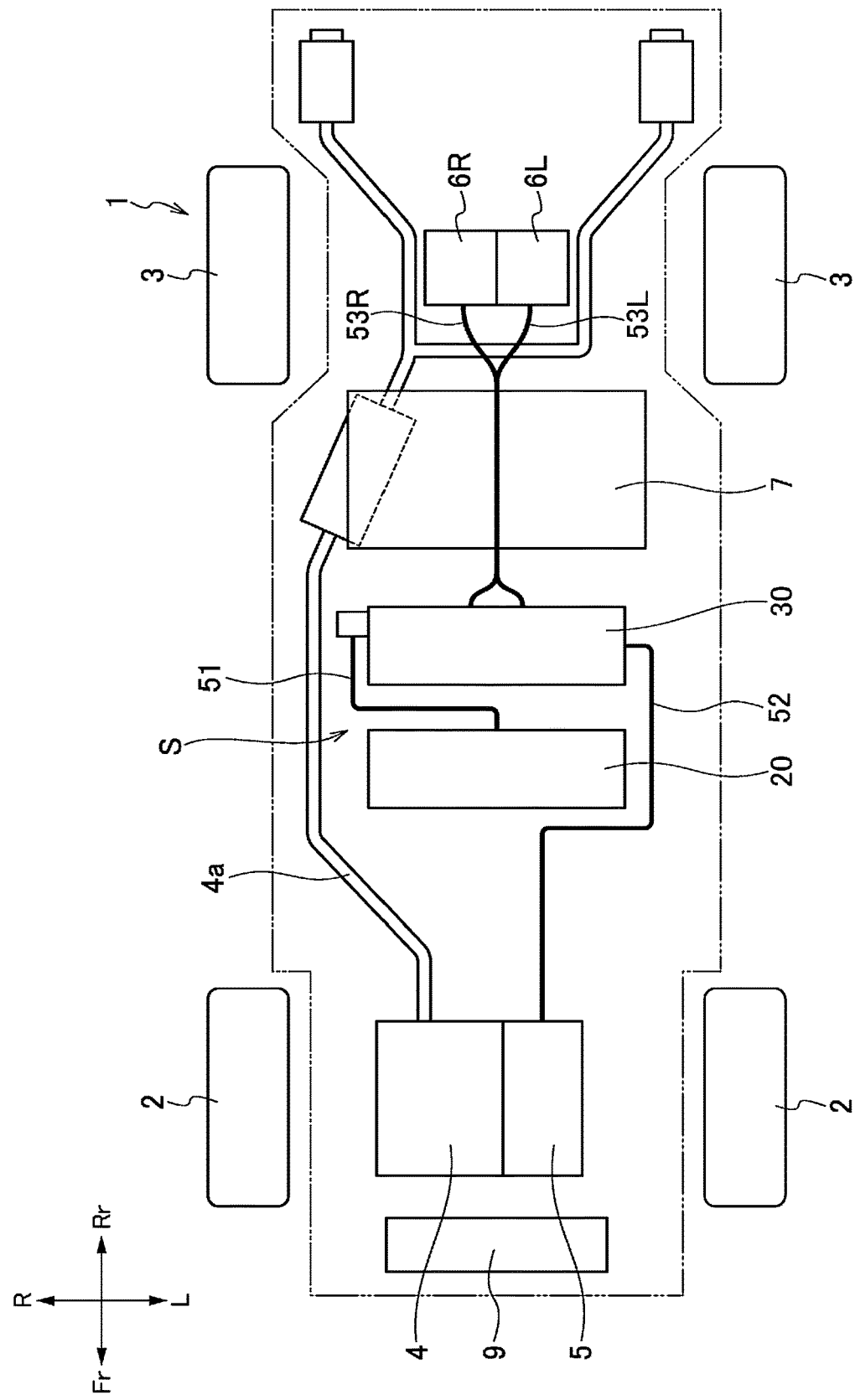
FIG. 1 is a schematic plan view illustrating the arrangement of main components of a vehicle according to an embodiment of the present disclosure.

The embodiments will now be described with reference to the accompanying drawings, wherein like reference numerals designate corresponding or identical elements throughout the various drawings.

Vehicle

A vehicle according to an embodiment of the present disclosure will be described with reference to the drawings. The drawings are to be viewed in the orientation of the reference numerals. In the following description, the front-rear, left-right, and up-down directions are the directions as viewed from the driver. In the drawings, the front, rear, left, right, up, and down sides of the vehicle are respectively denoted by Fr, Rr, L, R, U, and D.

Figure 2:
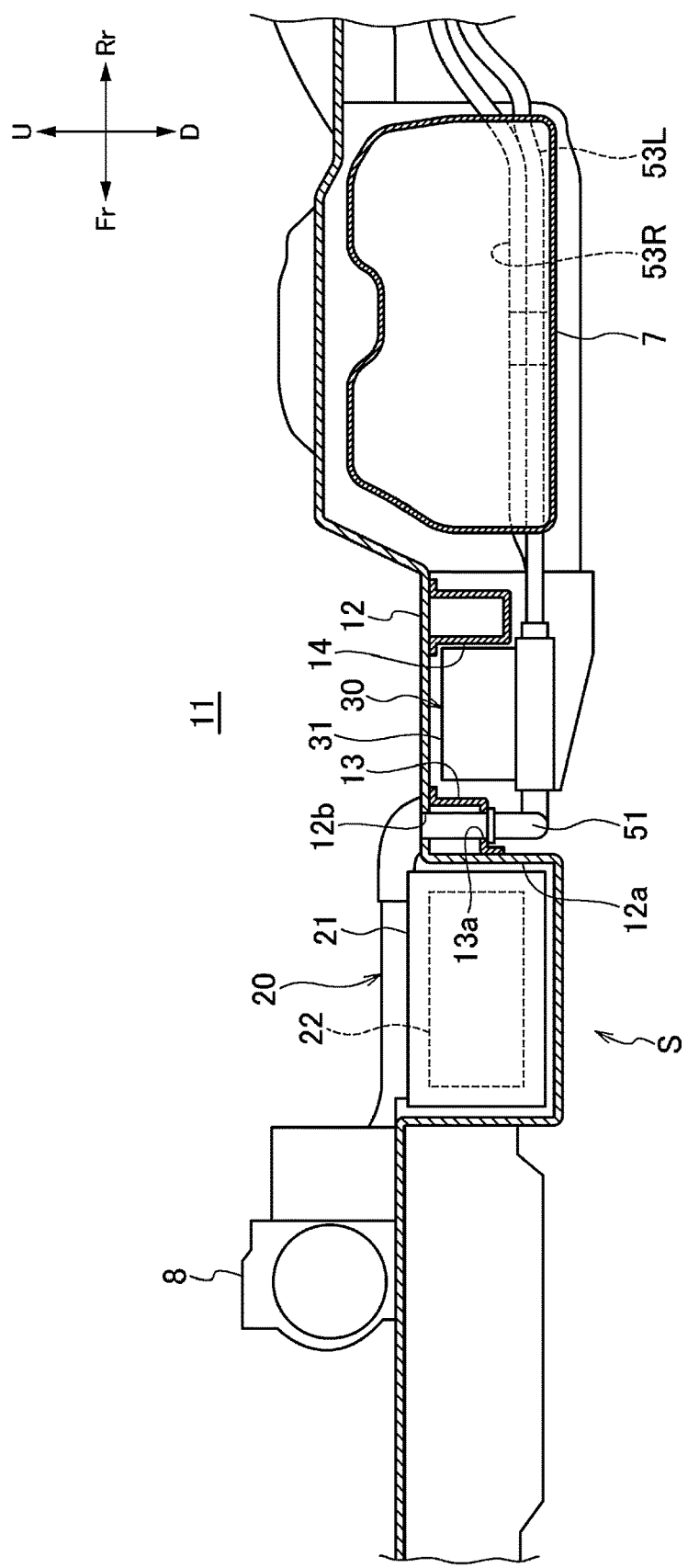
FIG. 2 is a schematic sectional view of a high-voltage-device arrangement section of the vehicle illustrated in FIG. 1, taken in a front-rear direction.
Figure 3:
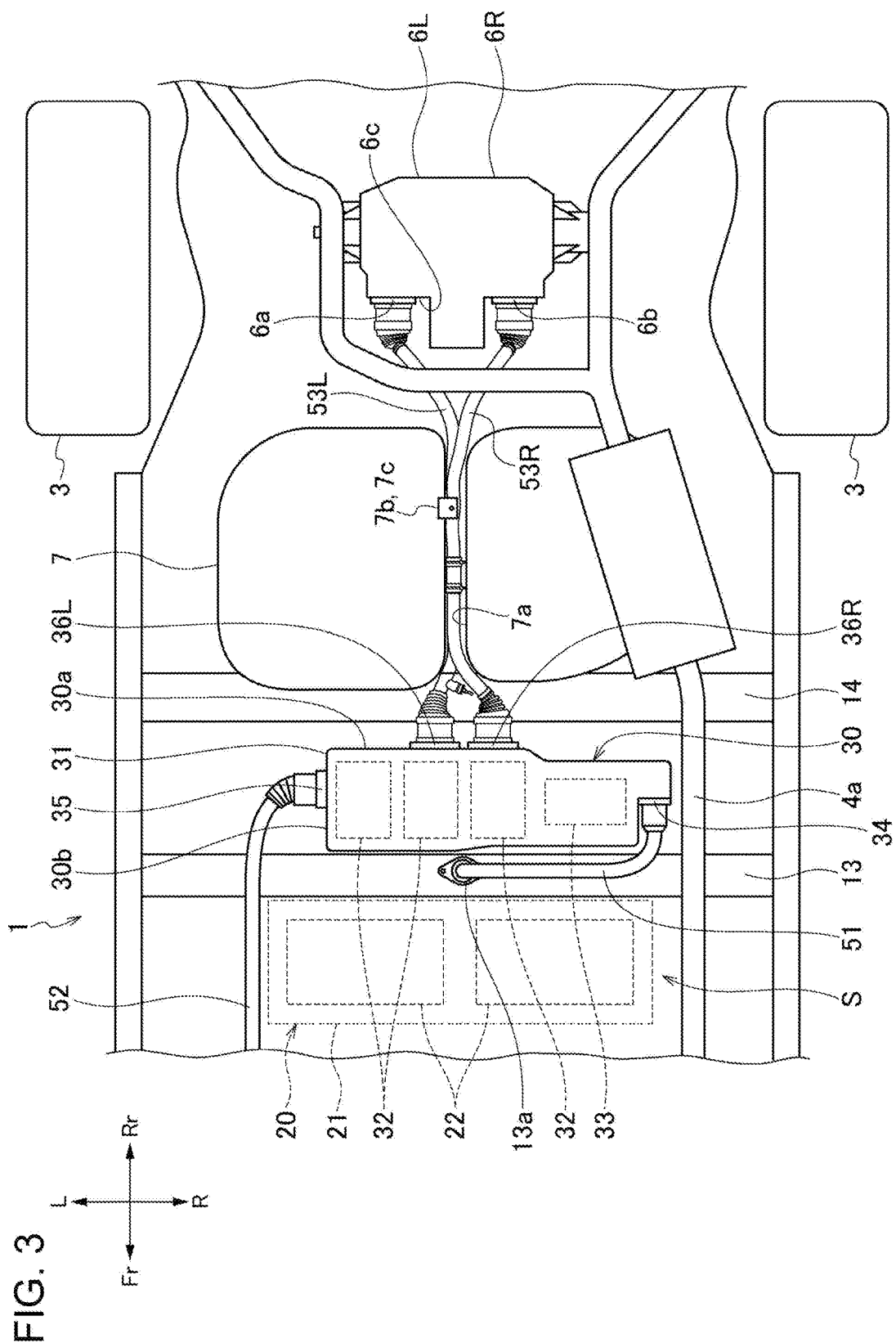
FIG. 3 is a bottom view of the high-voltage-device arrangement section, a fuel tank, and rear-wheel drive motors included in the vehicle illustrated in FIG. 1.

As shown in FIGS. 1 to 3, a vehicle 1 according to the present embodiment includes a structure for driving front wheels 2 and rear wheels 3. The structure includes an engine 4 and a front-wheel drive motor 5 for driving the front wheels 2; a left rear-wheel drive motor 6L for driving the left rear wheel 3; a right rear-wheel drive motor 6R for driving the right rear wheel 3; a battery unit 20 for supplying electric power to the motors 5, 6L, and 6R; a power conversion unit 30 that performs electric power conversion when the electric power of the battery unit 20 is supplied to the motors 5, 6L, and 6R; a fuel tank 7 that stores fuel for the engine 4; and an exhaust pipe 4a that guides the exhaust from the engine 4 to the rear of the vehicle 1. The engine 4 and the front-wheel drive motor 5 are disposed in an engine room located in a front section of the vehicle, and the rear-wheel drive motors 6L and 6R and the fuel tank 7 are disposed below a floor panel 12 in a rear section of the vehicle. The exhaust pipe 4a extends rearward from the engine 4 through a region on the right side of the fuel tank 7, and then branches into portions that extend further rearward through regions on the left and right sides of the rear-wheel drive motors 6L and 6R.

The battery unit 20 includes a housing 21 having a rectangular parallelepiped shape that extends in the left-right direction in plan view, a plurality of high-voltage batteries 22 that supply electric power to the motors 5, 6L, and 6R, and a cooling mechanism (not shown) that cools the high-voltage batteries 22. The high-voltage batteries 22 and the cooling mechanism are disposed in the housing 21.

The high-voltage batteries 22 are devices to be cooled having a low management temperature, and are easily affected by an outside air temperature (including a temperature increase due to the exhaust pipe 4a). The cooling mechanism for the battery unit 20 is an air-cooled cooling mechanism, which is suitable for cooling devices having a low management temperature, and cools the high-voltage batteries 22 by using the air in a vehicle cabin 11 (in the present embodiment, cold air ejected from an air-conditioning device 8 for conditioning the air in the vehicle cabin 11).

The power conversion unit 30 includes a housing 31 having a rectangular parallelepiped shape that extends in the left-right direction in plan view, a plurality of inverters 32 that perform electric power conversion when the electric power of the battery unit 20 is supplied to the motors 5, 6L, and 6R; a DC-DC converter 33 that performs voltage conversion to supply the electric power of the battery unit 20 to, for example, the air-conditioning device 8 and a low-voltage battery (not shown); and a cooling mechanism (not shown) for cooling the inverters 32 and the DC-DC converter 33. The inverters 32, the DC-DC converter 33, and the cooling mechanism are disposed in the housing 31.

The inverters 32 and the DC-DC converter 33 are devices to be cooled having a management temperature higher than that of the high-voltage batteries 22, and the influence thereon of the outside air temperature is small. The cooling mechanism for the power conversion unit 30 is a water-cooled cooling mechanism, which is suitable for cooling devices having a high management temperature, and cools the inverters 32 and the DC-DC converter 33 by using cooling water supplied from a radiator 9.

As shown in FIGS. 1 and 2, the battery unit 20 and the power conversion unit 30 are disposed in a high-voltage-device arrangement section S, which is provided in a central region of the vehicle 1. More specifically, the high-voltage-device arrangement section S is located between the front-wheel drive motor 5 and the rear-wheel drive motors 6L and 6R in the front-rear direction, and the battery unit 20 and the power conversion unit 30 are arranged next to each other in the front-rear direction in the high-voltage-device arrangement section S. The fuel tank 7 is disposed between the high-voltage-device arrangement section S and the rear-wheel drive motors 6L and 6R.

As shown in FIG. 2, the battery unit 20 is disposed in the vehicle cabin 11. More specifically, the battery unit 20 is disposed in a recess 12a formed in a side of the floor panel 12 that faces the vehicle cabin 11. The high-voltage batteries 22 included in the battery unit 20, which is disposed in the vehicle cabin 11, are cooled by cold air ejected from the air-conditioning device 8 for conditioning the air in the vehicle cabin 11.

The power conversion unit 30 is disposed outside the vehicle cabin 11. More specifically, the power conversion unit 30 is disposed behind the battery unit 20 and below the floor panel 12. The inverters 32 and the DC-DC converter 33 included in the power conversion unit 30, which is disposed outside the vehicle cabin 11, are cooled by the cooling water supplied from the radiator 9 through a region outside the vehicle cabin 11.

A center cross member 13 and a rear cross member 14, which reinforce the floor panel 12, are provided on a side of the floor panel 12 that is outside the vehicle cabin 11. Each of the center cross member 13 and the rear cross member 14 forms a closed cross section together with the floor panel 12, so that the floor panel 12 has sufficient rigidity. The center cross member 13 is located between the battery unit 20 and the power conversion unit 30, and the rear cross member 14 is located between the power conversion unit 30 and the fuel tank 7.

The battery unit 20 and the power conversion unit 30 are respectively disposed inside and outside the vehicle cabin 11 with the floor panel 12 disposed therebetween, and are arranged so as to overlap in the height direction. The top surfaces of the battery unit 20 and the power conversion unit 30 are at substantially the same height, and are lower than the top surface of the fuel tank 7, which is disposed in a rear section. Accordingly, although the battery unit 20 is disposed in the vehicle cabin 11, the battery unit 20 does not protrude into the vehicle cabin 11. The bottom surfaces of the battery unit 20 and the power conversion unit 30 are also at substantially the same height, and the height thereof is substantially the same as the height of the bottom surface of the fuel tank 7 disposed in the rear section. Accordingly, none of these components protrude downward.

Arrangement of Connectors of Power Conversion Unit

The arrangement of connectors of the power conversion unit 30 will now be described with reference to FIGS. 3 to 6.

As shown in FIGS. 3 to 6, all of the electrical connections between the power conversion unit 30 and other devices are provided by connectors. The connectors of the power conversion unit 30 include a direct-current cable connector 34, a front three-phase cable connector 35, rear three-phase cable connectors 36L and 36R, an air-conditioning cable connector 37, and a control harness connector 38.

The direct-current cable connector 34 is connected to the battery unit 20 by a direct-current cable 51, and inputs direct-current high-voltage electric power supplied from the battery unit 20 to the inverters 32 and the DC-DC converter 33. The housing 31 of the power conversion unit 30 includes a projecting portion 31a that projects rightward from a right side surface 30c thereof, and the direct-current cable connector 34 is provided on a front surface 30d of the projecting portion 31a. The direct-current cable 51, which is connected to the direct-current cable connector 34, extends parallel to the front surface of the power conversion unit 30 below the center cross member 13 after being bent the first time, and then extends through a through hole 13a in the center cross member 13 and a through hole 12b in the floor panel 12 and enters the vehicle cabin 11 after being bent the second time. Thus, the direct-current cable 51 is connected to the battery unit 20. The through hole 13a in the center cross member 13 and the through hole 12b in the floor panel 12 overlap in plan view.

The direct-current cable connector 34 according to present embodiment is integrated with a low-voltage output cable connector, which supplies low-voltage electric power converted by the DC-DC converter 33 to a low-voltage device, such as a low-voltage battery. More specifically, the direct-current cable 51 according to the present embodiment includes a high-voltage direct current line connected to the battery unit 20, and a low-voltage direct current line connected to the low-voltage device. Owing to the connection between the direct-current cable 51 and the direct-current cable connector 34, not only can the electric power from the battery unit 20 be input to the power conversion unit 30, the low-voltage electric power converted by the DC-DC converter 33 can be output to a low-voltage device, such as a low-voltage battery.

The front three-phase cable connector 35 is connected to the front-wheel drive motor 5 by a front three-phase cable 52, and supplies three-phase electric power converted by the inverters 32 to the front-wheel drive motor 5. The front three-phase cable connector 35 according to the present embodiment is provided on a left side surface 30b of the power conversion unit 30. The front three-phase cable 52, which is connected to the front three-phase cable connector 35, extends toward the front of the vehicle 1 at a side of the battery unit 20 after being bent the first time, extends parallel to the front surface of the battery unit 20 after being bent the second time, and is connected to the front-wheel drive motor 5 after being bent the third time.

The rear three-phase cable connectors 36L and 36R are respectively connected to the left and right rear-wheel drive motors 6L and 6R by a pair of rear three-phase cables 53L and 53R, and supply the three-phase electric power converted by the inverters 32 to the left and right rear-wheel drive motors 6L and 6R. The rear three-phase cable connectors 36L and 36R according to the present embodiment are arranged next to each other in the left-right direction on a rear surface 30a of the power conversion unit 30 in a central region of the rear surface 30a in the left-right direction. The rear three-phase cables 53L and 53R, which are connected to the rear three-phase cable connectors 36L and 36R, extend through a recess 7a in the fuel tank 7 to a rear section of the vehicle 1, and are respectively connected to the rear-wheel drive motors 6L and 6R.

The air-conditioning cable connector 37 is connected to the air-conditioning device 8 by an air-conditioning cable (not shown), and supplies the electric power subjected to voltage conversion performed by the DC-DC converter 33 to the air-conditioning device 8. The control harness connector 38 is connected to an ECU (not shown) by a control harness (not shown), and enables transmission of control signals between the ECU and the inverters 32. The air-conditioning cable connector 37 and the control harness connector 38 according to the present embodiment are arranged on the left side surface 30b of the power conversion unit 30 together with the front three-phase cable connector 35. Since the connectors 35, 37, and 38 are near each other, the arrangement of the cables can be facilitated.

Arrangement of Rear Three-Phase Cables

The arrangement of the pair of rear three-phase cables 53L and 53R will now be described with reference to FIG. 3.

As shown in FIG. 3, the power conversion unit 30 includes the left and right rear three-phase cable connectors 36L and 36R on the rear surface 30a that opposes the rear-wheel drive motors 6L and 6R, and the rear-wheel drive motors 6L and 6R include left and right rear three-phase cable connectors 6a and 6b on front surfaces 6c thereof that oppose the power conversion unit 30. The pair of rear three-phase cables 53L and 53R, which connect the rear three-phase cable connectors 36L and 36R of the power conversion unit 30 to the rear three-phase cable connectors 6a and 6b of the rear-wheel drive motors 6L and 6R, overlap the fuel tank 7, which is disposed between the power conversion unit 30 and the rear-wheel drive motors 6L and 6R, in bottom view.

The recess 7a, which is recessed upward, is formed in the bottom surface of the fuel tank 7 so as to extend in the front-rear direction. Intermediate portions of the pair of rear three-phase cables 53L and 53R are disposed in the recess 7a in the fuel tank 7, thereby being linearly arranged and protected by the fuel tank 7. In the present embodiment, the recess 7a is disposed in a central region of the fuel tank 7 in the vehicle width direction to reduce the impact of a side collision on the rear three-phase cables 53L and 53R.

The intermediate portions of the pair of rear three-phase cables 53L and 53R are arranged in the height direction in the recess 7a, and are retained by a bracket 7b provided in the recess 7a. The bracket 7b includes a cable retaining portion 7c that retains the pair of rear three-phase cables 53L and 53R from below (at the bottom). Even when the rear three-phase cables 53L and 53R approach the ground, the cable retaining portion 7c comes into contact with the ground first, so that the risk of damage to the rear three-phase cables 53L and 53R can be reduced.

The left and right rear three-phase cable connectors 36L and 36R provided on the power conversion unit 30 and the left and right rear three-phase cable connectors 6a and 6b provided on the rear-wheel drive motors 6L and 6R are laterally symmetrical in the vehicle width direction about the recess 7a. Accordingly, the pair of rear three-phase cables 53L and 53R may have the same structure.

Rear Three-Phase Cable Structure

The structure of the rear three-phase cables 53L and 53R will now be described with reference to FIGS. 7 and 8.

Figure 7:
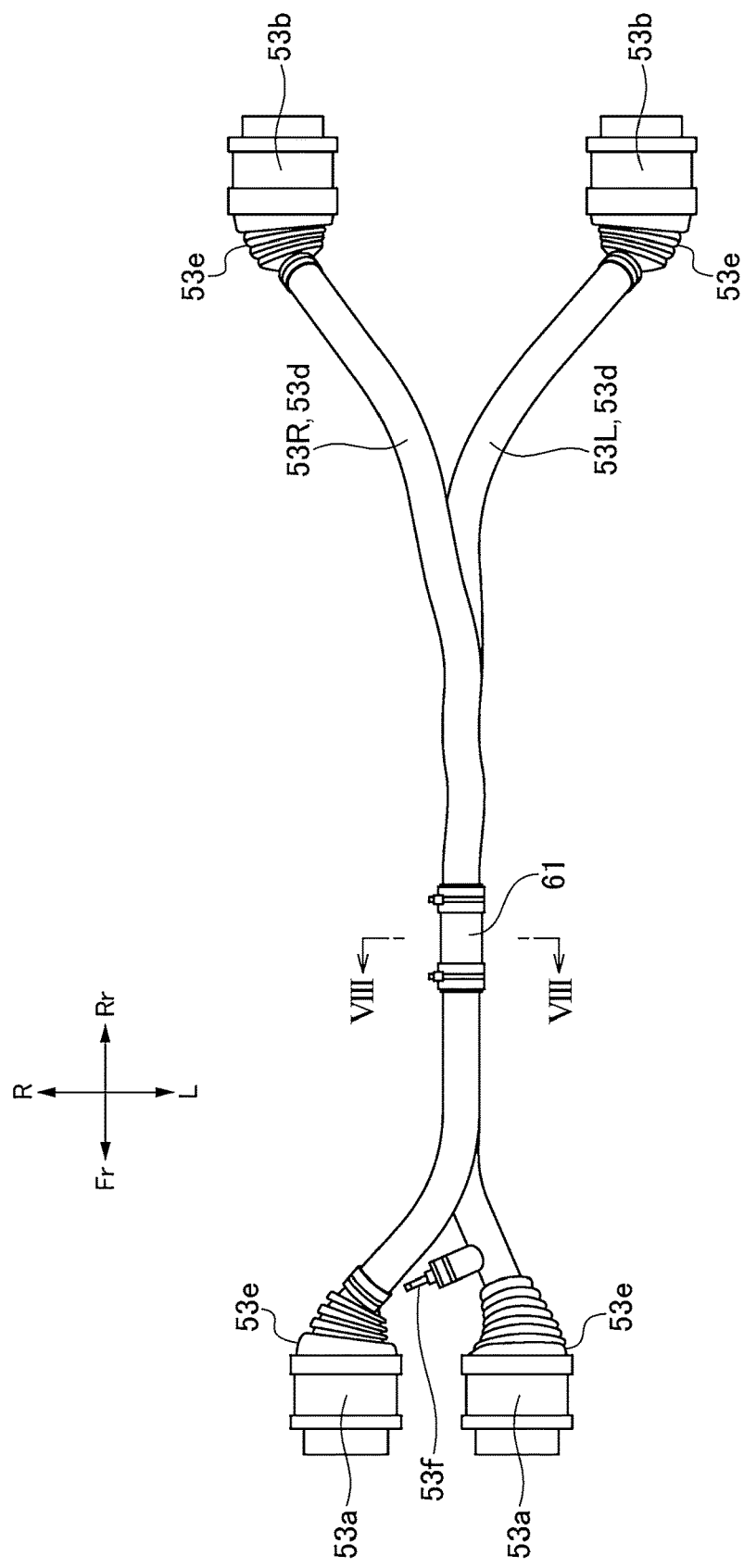
FIG. 7 is a plan view of rear three-phase cables according to the embodiment of the present disclosure.
Figure 8:
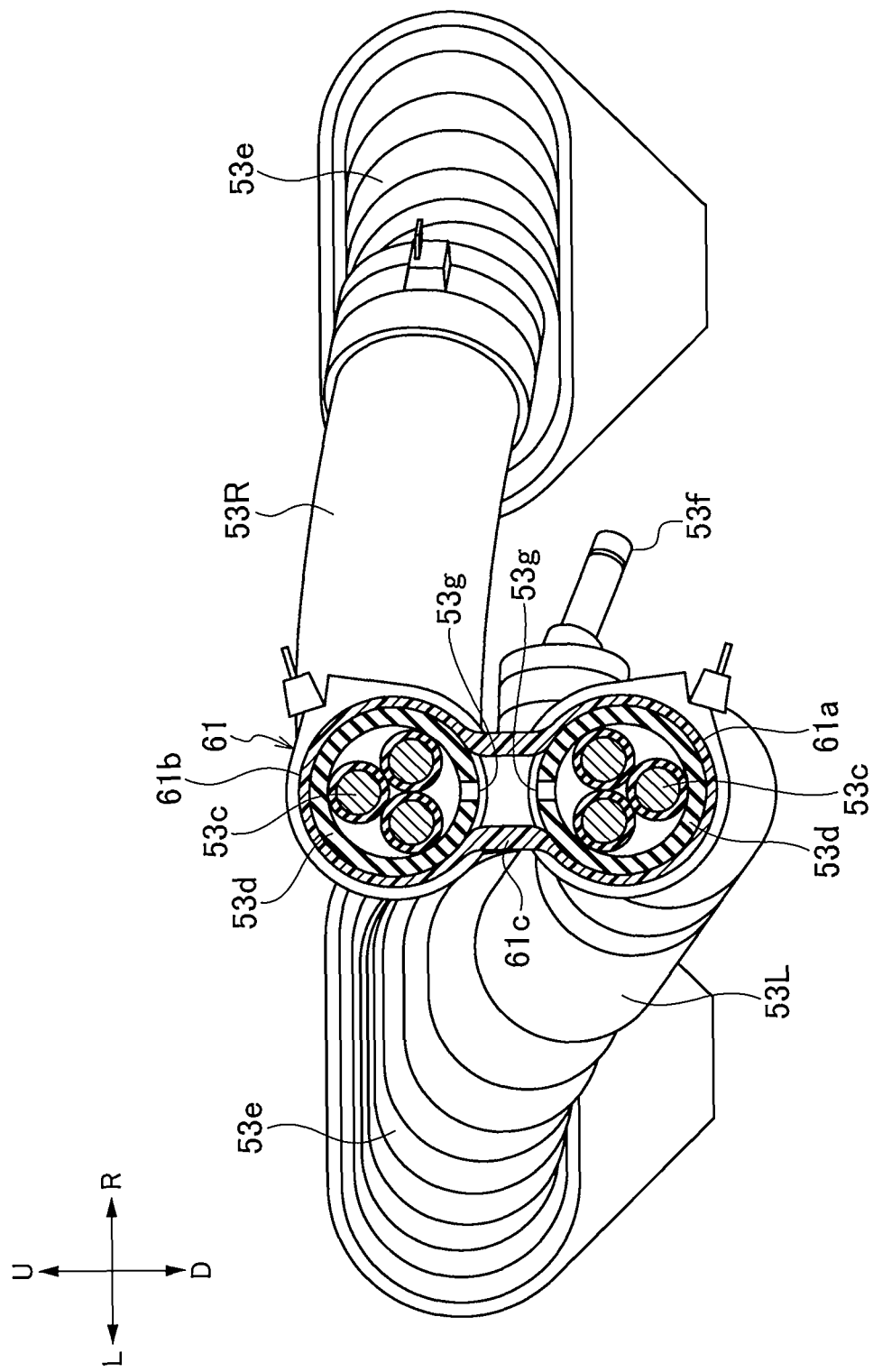
FIG. 8 is a sectional view taken along line VIII-VIII in FIG. 7.

As shown in FIGS. 7 and 8, the rear three-phase cables 53L and 53R are connector cables having a waterproof function. Each of the rear three-phase cables 53L and 53R includes a power-conversion connector 53a connected to the corresponding one of the rear three-phase cable connectors 36L and 36R of the power conversion unit 30; a motor connector 53b connected to the corresponding one of the rear three-phase cable connectors 6a and 6b of the rear-wheel drive motors 6L and 6R; a three-phase line 53c that electrically connects the power-conversion connector 53a to the motor connector 53b; a corrugated tube 53d that covers the three-phase line 53c; and sealing grommets 53e that airtightly connect the connectors 53a and 53b to the corrugated tube 53d.

The rear three-phase cables 53L and 53R having the above-described waterproof function are each required to enable ventilation of the space inside the corrugated tube 53d to reduce the risk that the corrugated tube 53d and the sealing grommets 53e will be damaged due to expansion and compression of the air in the corrugated tube 53d caused by a change in environmental temperature or self-heating. For example, a ventilation-tube connecting portion 53f is provided on the corrugated tube 53d, so that the space inside the corrugated tube 53d can be ventilated through the ventilation-tube connecting portion 53f.

In the present embodiment, the ventilation structures for enabling ventilation of the pair of rear three-phase cables 53L and 53R are integrated together to simplify the structure. More specifically, the space inside the corrugated tube 53d of the rear three-phase cable 53L and the space inside the corrugated tube 53d of the rear three-phase cable 53R are configured to communicate with each other, and the ventilation-tube connecting portion 53f is provided on the corrugated tube 53d of the rear three-phase cable 53L, so that the spaces inside the corrugated tubes 53d of the rear three-phase cables 53L and 53R can both be ventilated through the ventilation-tube connecting portion 53f.

In the present embodiment, a connecting grommet 61, which retains the corrugated tubes 53d of the pair of rear three-phase cables 53L and 53R in a connected state, is used to enable the spaces inside the corrugated tubes 53d of the pair of rear three-phase cables 53L and 53R to communicate with each other. The connecting grommet 61 includes a first retaining portion 61a that is airtightly fitted around the corrugated tube 53d of the rear three-phase cable 53L, a second retaining portion 61b that is airtightly fitted around the corrugated tube 53d of the rear three-phase cable 53R, and a communicating portion 61c that connects the first retaining portion 61a and the second retaining portion 61b to each other and enables the inside of the first retaining portion 61a and the inside of the second retaining portion 61b to communicate with each other. The corrugated tubes 53d of the pair of rear three-phase cables 53L and 53R have communication holes 53g through which the spaces inside the corrugated tubes 53d communicate with the communicating portion 61c of the connecting grommet 61. Thus, the spaces inside the corrugated tubes 53d of the pair of rear three-phase cables 53L and 53R communicate with each other through the connecting grommet 61.

Ventilation Structure of Power Conversion Unit

The ventilation structure of the power conversion unit 30 will now be described with reference to FIG. 4.

Figure 4:
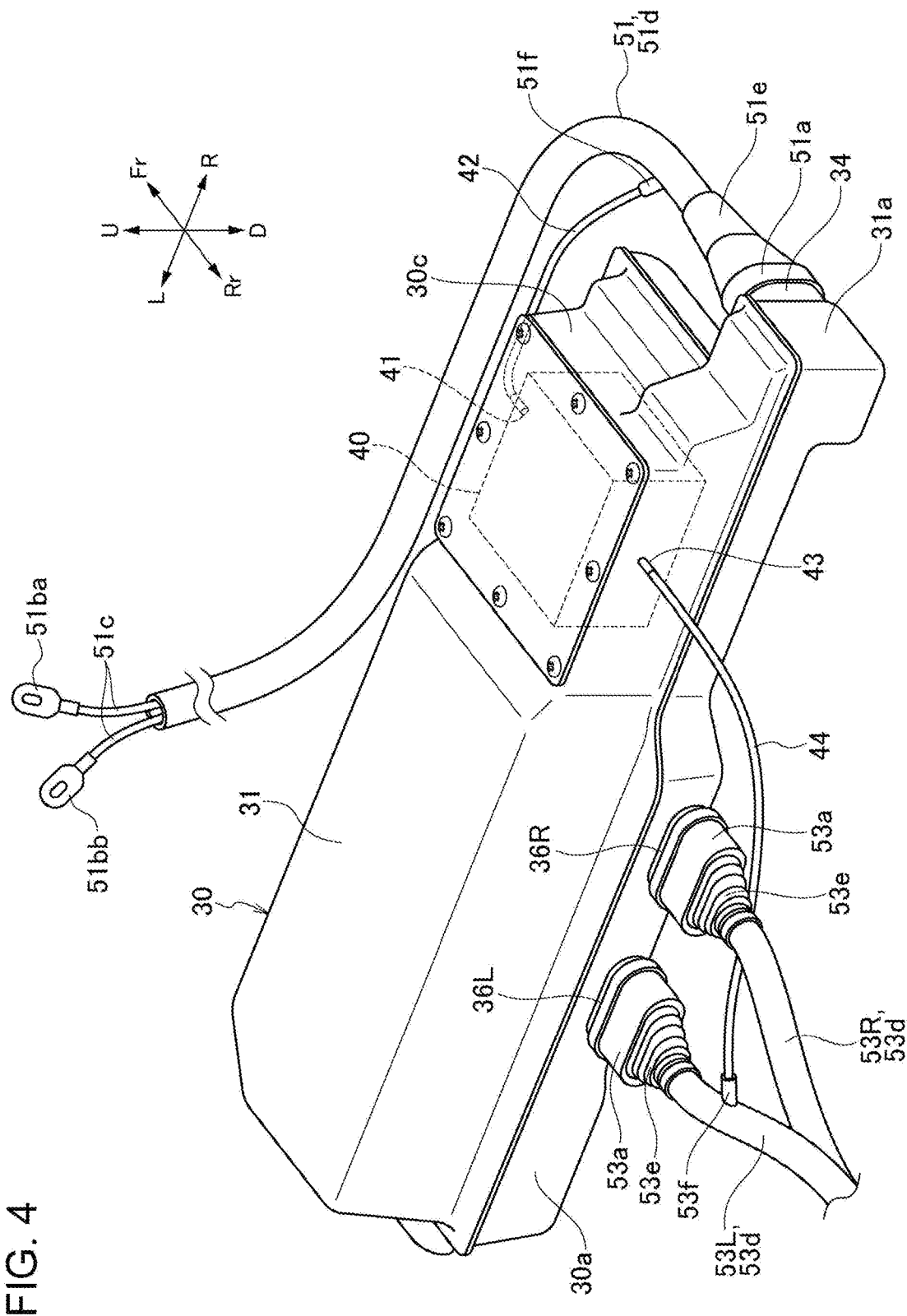
FIG. 4 is a perspective view illustrating the state in which cables are connected to a power conversion unit according to the embodiment of the present disclosure.
Figure 5:
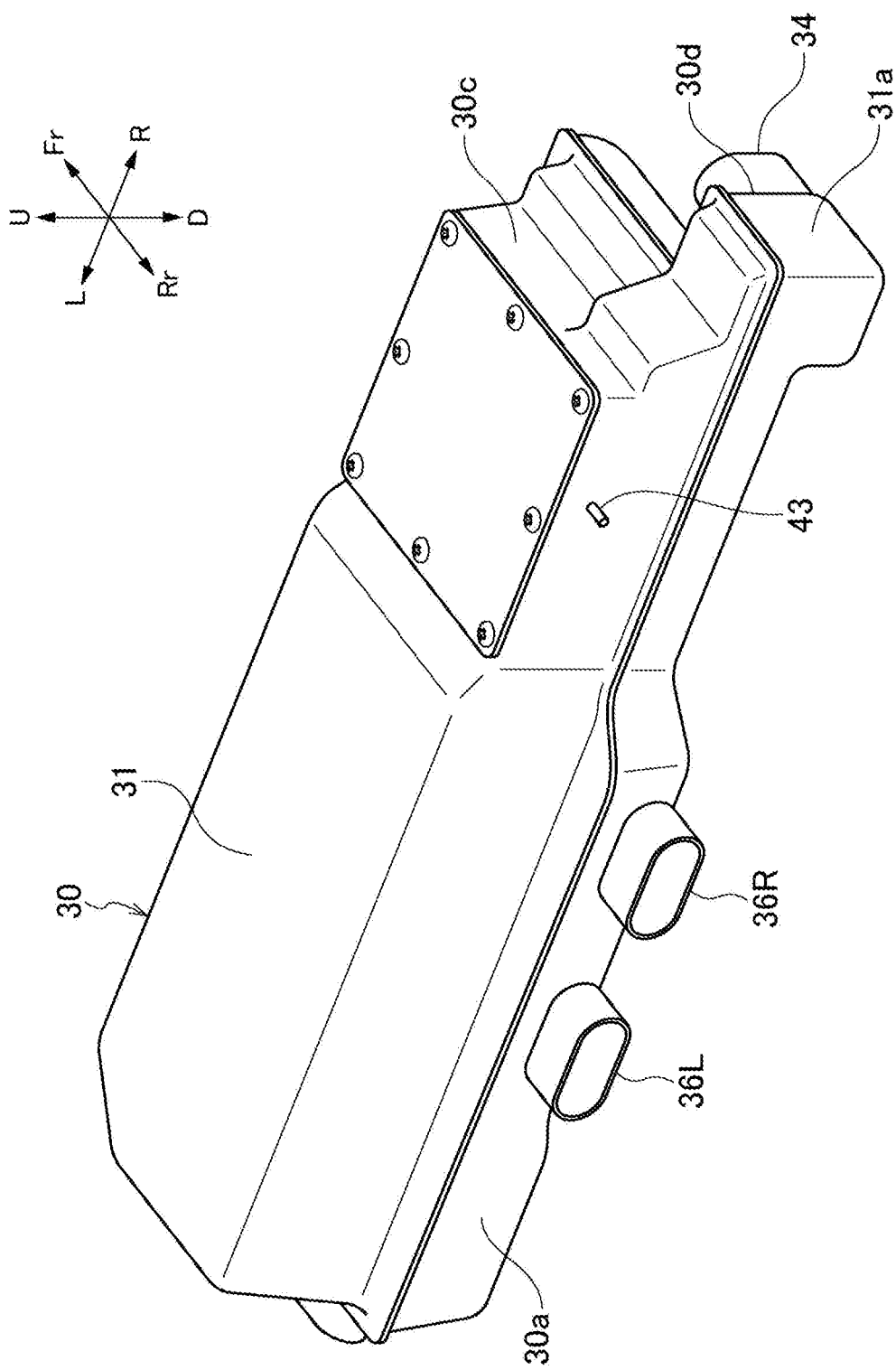
FIG. 5 is a perspective view of the power conversion unit according to the embodiment of the present disclosure.
Figure 6:
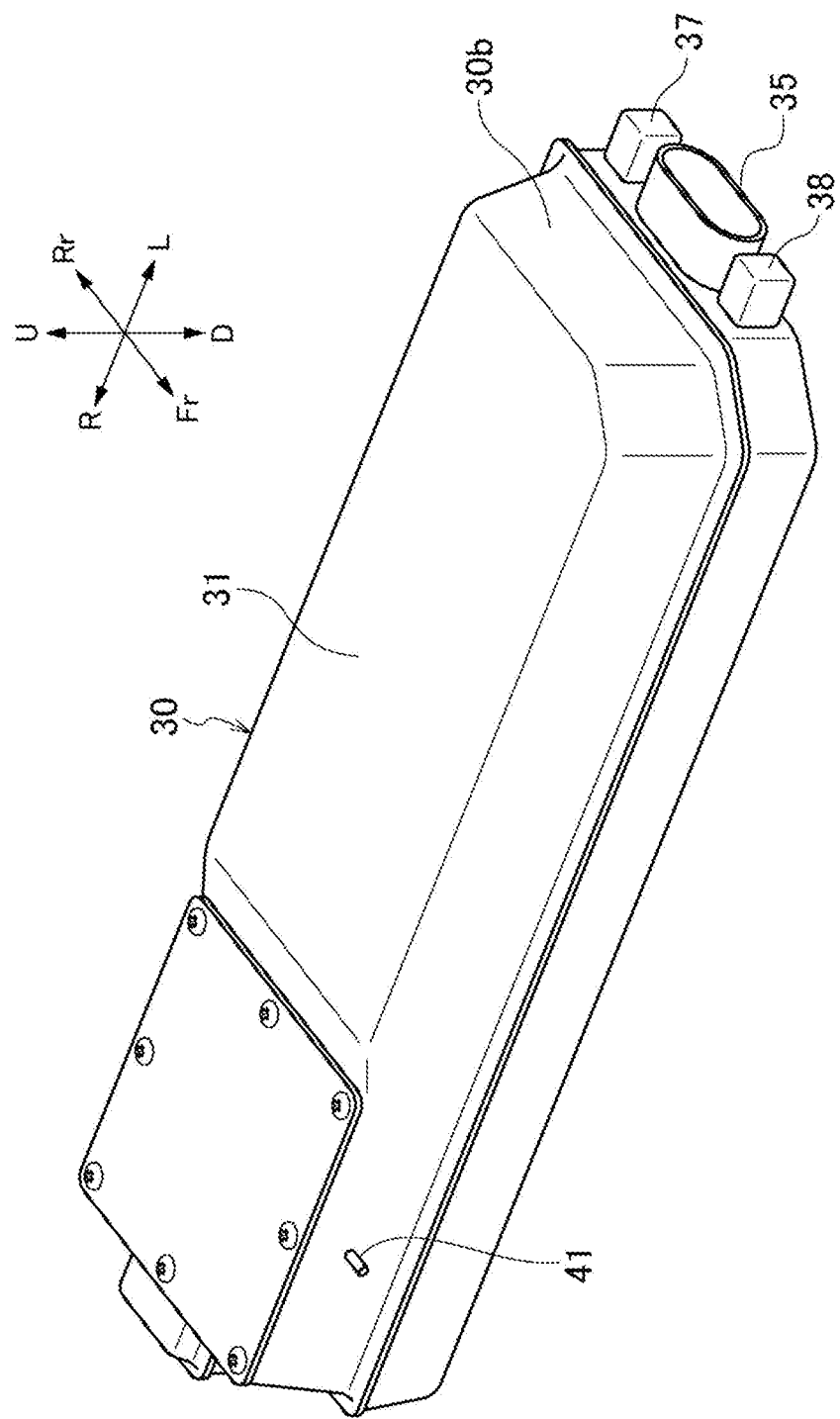
FIG. 6 is a perspective view of the power conversion unit according to the embodiment of the present disclosure viewed in another direction.

As shown in FIG. 4, the power conversion unit 30 includes a breather chamber 40 that enables ventilation of an electronic-device accommodation space provided in the power conversion unit 30. The breather chamber 40 communicates with the electronic-device accommodation space in the power conversion unit 30 through a vent plug (not shown), and also communicates with the space outside the power conversion unit 30 through a ventilation nozzle 41.

In the present embodiment, the direct-current cable 51, which extends inside and outside the vehicle cabin 11, is used to enable the breather chamber 40 to communicate with the space inside the vehicle cabin 11. The direct-current cable 51 includes a power-conversion connector 51a connected to the direct-current cable connector 34 of the power conversion unit 30; a battery terminal 51ba connected to the battery unit 20; a low-voltage-device terminal 51bb connected to the low-voltage device; direct current lines 51c that electrically connect the power-conversion connector 51a to the battery terminal 51ba and to the low-voltage-device terminal 51bb; a corrugated tube 51d that covers the direct current lines 51c; a sealing grommet 51e that airtightly connects the power-conversion connector 51a to the corrugated tube 51d; and a ventilation-tube connecting portion 51f that is disposed near the power-conversion connector 51a and that communicates with the space inside the corrugated tube 51d. The ventilation-tube connecting portion 51f is connected to the ventilation nozzle 41 of the breather chamber 40 by a ventilation tube 42. Accordingly, the breather chamber 40 communicates with the space inside the vehicle cabin 11 through the spaces inside the ventilation tube 42 and the direct-current cable 51.

In the present embodiment, the breather chamber 40 of the power conversion unit 30 is used to enable ventilation of the spaces inside the corrugated tubes 53d of the rear three-phase cables 53L and 53R. More specifically, the ventilation-tube connecting portion 53f of the rear three-phase cables 53L and 53R is connected to an auxiliary ventilation nozzle 43 provided on the breather chamber 40 by a ventilation tube 44, so that the spaces inside the corrugated tubes 53d of the rear three-phase cables 53L and 53R communicate with the space inside the vehicle cabin 11 through the spaces inside the breather chamber 40, the ventilation tube 42, and the direct-current cable 51.

As described above, in the vehicle 1 according to the present embodiment, since the power conversion unit 30 is disposed outside the vehicle cabin 11, the space in the vehicle cabin 11 is larger than that in the case where the battery unit 20 and the power conversion unit 30 are disposed in the vehicle cabin 11. In addition, countermeasures against high-frequency noise are not required. In addition, since the battery unit 20 is disposed inside the vehicle cabin 11, the risk of reduction in output or degradation of the high-voltage batteries 22 due to the influence of the outside air temperature can be reduced, and the high-voltage device can be protected from external impact.

Since the battery unit 20 and the power conversion unit 30 are arranged next to each other in the front-rear direction, impact protection therefor can be integrated at a single location. Therefore, the vehicle structure is simpler than that in the case where the battery unit 20 and the power conversion unit 30 are apart from each other. In addition, the length of the direct-current cable 51, which connects the battery unit 20 to the power conversion unit 30, can be minimized.

Since the battery unit 20 and the power conversion unit 30 are arranged so as to overlap in the height direction, the size of the space in the vehicle cabin 11 is large in the height direction. In addition, since the battery unit 20 and the power conversion unit 30 are arranged near each other in the vicinity of the floor panel 12, the height of the center of gravity of the vehicle 1 is reduced and the steerability is increased accordingly.

Since the battery unit 20, which is disposed inside the vehicle cabin 11, is air-cooled and the power conversion unit 30, which is disposed outside the vehicle cabin 11, is water-cooled, cooling structures that are optimal for the respective devices can be employed.

Since the inverters 32 and the DC-DC converter 33, which have management temperatures higher than that of the high-voltage batteries 22, are both disposed outside the vehicle cabin 11 and water-cooled, a cooling structure optimal for the high-voltage batteries 22 can be used to cool the high-voltage batteries 22. As a result, the range of use of the high-voltage batteries 22 can be increased, and the fuel efficiency and power performance can be improved.

The inverters 32 and the DC-DC converter 33 are disposed in the same housing 31 as a unit. Therefore, the water-cooled cooling structure can be simplified.

Since the battery unit 20 and the power conversion unit 30 are arranged between the front-wheel drive motor 5 and the rear-wheel drive motors 6L and 6R in the front-rear direction, the lengths of the three-phase cables 52, 53L, and 53R, which extend from the power conversion unit 30 to the front-wheel drive motor 5 and the rear-wheel drive motors 6L and 6R, can be reduced. In addition, since the battery unit 20 and the power conversion unit 30 are disposed in a central region of the vehicle 1, the moment of the vehicle 1 is reduced, and the weight of the frame can be reduced accordingly.

The present disclosure is not limited to the above-described embodiment, and modifications, improvements, etc., may be made as appropriate. For example, although the vehicle of the above-described embodiment includes the front-wheel drive motor and the rear-wheel drive motors, the vehicle may instead include only the front-wheel drive motor or the rear-wheel drive motors. Alternatively, a motor used to drive both the front and rear wheels may be provided.

According to an aspect of the present disclosure, a vehicle (for example, vehicle 1 according to the embodiment described below) includes a motor (for example, front-wheel drive motor 5 and rear-wheel drive motors 6L and 6R according to the embodiment described below); a high-voltage device (for example, high-voltage batteries 22 or battery unit 20 according to the embodiment described below) that supplies electric power to the motor; and a power converter (for example, inverters 32 or power conversion unit 30 according to the embodiment described below) that performs electric power conversion when the electric power of the high-voltage device is supplied to the motor. The high-voltage device is disposed inside a vehicle cabin (for example, vehicle cabin 11 according to the embodiment described below). The power converter is disposed outside the vehicle cabin. The high-voltage device and the power converter are arranged next to each other in a front-rear direction.

According to the above-described aspect of the present disclosure, since the power converter is disposed outside the vehicle cabin, the space in the vehicle cabin is larger than that in the case where the high-voltage device and the power converter are disposed in the vehicle cabin. In addition, countermeasures against high-frequency noise are not required. In addition, since the high-voltage device is disposed inside the vehicle cabin, the risk of reduction in output or degradation of the high-voltage device due to the influence of the outside air temperature can be reduced, and the high-voltage device can be protected from external impact. In addition, since the high-voltage device and the power converter are arranged next to each other in the front-rear direction, impact protection therefor can be integrated at a single location. Therefore, the vehicle structure is simpler than that in the case where the high-voltage device and the power converter are apart from each other. In addition, the length of the high-voltage line that connects the high-voltage device to the power converter can be minimized.

In the vehicle, the high-voltage device may be disposed in a recess (for example, recess 12a according to the embodiment described below) provided in a floor panel (for example, floor panel 12 according to the embodiment described below), and the high-voltage device and the power converter may be arranged so as to overlap in a height direction.

In this case, since the high-voltage device and the power converter are arranged so as to overlap in the height direction, the size of the space in the vehicle cabin is large in the height direction. In addition, since the high-voltage device and the power converter are arranged near each other in the vicinity of the floor panel, the height of the center of gravity of the vehicle is reduced and the steerability is increased accordingly.

In the vehicle, the high-voltage device may be air-cooled, and the power converter may be water-cooled.

In this case, since the high-voltage device, which is disposed inside the vehicle cabin, is air-cooled and the power converter, which is disposed outside the vehicle cabin, is water-cooled, cooling structures that are optimal for the respective devices can be employed.

The vehicle may further include a voltage converter (for example, DC-DC converter 33 according to the embodiment described below) that performs voltage conversion for supplying the electric power of the high-voltage device to an auxiliary device or a low-voltage device. The voltage converter may be disposed outside the vehicle cabin together with the power converter. The voltage converter may be water-cooled together with the power converter.

In this case, since the voltage converter and the power converter, which have management temperatures higher than that of the high-voltage device, are both disposed outside the vehicle cabin and water-cooled, a cooling structure optimal for the high-voltage device can be used to cool the high-voltage device. As a result, the range of use of the high-voltage device can be increased, and the fuel efficiency and power performance can be improved.

In the vehicle, the power converter and the voltage converter may be disposed in a housing (for example, housing 31 according to the embodiment described below).

In this case, the power converter and the voltage converter are disposed in the housing as a unit. Therefore, the water-cooled cooling structure can be simplified.

In the vehicle, the motor may include a first motor (for example, front-wheel drive motor 5 according to the embodiment described below) and a second motor (for example, rear-wheel drive motors 6L and 6R according to the embodiment described below). The first motor may be disposed in a front section of the vehicle. The second motor may be disposed in a rear section of the vehicle. The high-voltage device and the power converter may be disposed between the first motor and the second motor in the front-rear direction.

In this case, since the high-voltage device and the power converter are arranged between the first motor and the second motor in the front-rear direction, the lengths of the three-phase lines that extend from the power converter to the first motor and the second motor can be reduced. In addition, since the high-voltage device and the power converter are disposed in a central region of the vehicle, the moment of the vehicle is reduced, and the weight of the frame can be reduced accordingly.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a cross member;
a motor;
a high-voltage device that supplies electric power to the motor;
a power converter that performs electric power conversion when the electric power of the high-voltage device is supplied to the motor; and
a voltage converter that performs voltage conversion for supplying the electric power of the high-voltage device to an auxiliary device or a low-voltage device,
wherein the high-voltage device is disposed inside a vehicle cabin,
wherein the power converter is disposed outside the vehicle cabin,
wherein the high-voltage device and the power converter are arranged adjacent to each other with the cross member therebetween in a front-rear direction,
wherein the high-voltage device and the power converter are provided close to the cross member such that a first distance in the front-rear direction between the high-voltage device and the cross member is substantially equal to a second distance in the front-rear direction between the power converter and the cross member,
wherein the high-voltage device is air-cooled, and the power converter is water-cooled,
wherein the voltage converter is disposed outside the vehicle cabin together with the power converter, and
wherein the voltage converter is water-cooled together with the power converter.

2. The vehicle according to claim 1,
wherein the high-voltage device is disposed in a recess provided in a floor panel, and
wherein the high-voltage device and the power converter are arranged so as to overlap when viewed from the front-rear direction.

3. The vehicle according to claim 1, wherein the power converter and the voltage converter are disposed in a housing.

4. The vehicle according to claim 1, wherein the motor includes a first motor and a second motor,
wherein the first motor is disposed in a front section of the vehicle,
wherein the second motor is disposed in a rear section of the vehicle, and wherein the high-voltage device and the power converter are disposed between the first motor and the second motor in the front-rear direction.

5. The vehicle according to claim 1, wherein the power converter is directly connected to the high-voltage device.

6. A vehicle comprising:
a motor to move the vehicle;
a high-voltage device disposed inside a vehicle cabin of the vehicle;
a power converter disposed outside the vehicle cabin and connected to the motor and the high-voltage device to convert electric power output from the high-voltage device and to supply the converted electric power to the motor, the high-voltage device being arranged to be juxtaposed to the power converter along a front-rear direction of the vehicle;
a voltage converter that performs voltage conversion for supplying the electric power of the high-voltage device to an auxiliary device or a low-voltage device,
wherein the high-voltage device is air-cooled, and the power converter is water-cooled,
wherein the voltage converter is disposed outside the vehicle cabin together with the power converter, and
wherein the voltage converter is water-cooled together with the power converter.

7. The vehicle according to claim 6, wherein the high-voltage device is disposed in a recess provided in a floor panel, and
wherein the high-voltage device and the power converter are arranged so as to overlap when viewed from the front-rear direction.

8. The vehicle according to claim 6, wherein the power converter and the voltage converter are disposed in a housing.

9. The vehicle according to claim 6, wherein the motor includes a first motor and a second motor,
wherein the first motor is disposed in a front section of the vehicle,
wherein the second motor is disposed in a rear section of the vehicle, and
wherein the high-voltage device and the power converter are disposed between the first motor and the second motor in the front-rear direction.

10. A vehicle comprising:
a cross member including a through hole;
a motor;
a high-voltage device that supplies electric power to the motor; and
a power converter that performs electric power conversion when the electric power of the high-voltage device is supplied to the motor,
wherein the high-voltage device is disposed inside a vehicle cabin,
wherein the power converter is disposed outside the vehicle cabin,
wherein the high-voltage device and the power converter are arranged adjacent to each other in a front-rear direction, and
wherein a cable connecting the high-voltage device and the power converter passes through the through hole.

11. The vehicle according to claim 10, further comprising:
a floor panel to define the vehicle cabin, the floor panel including a floor through hole;
wherein the cross member is provided under the floor panel in a height direction of the vehicle to reinforce the floor panel, and
wherein the cable passes through the through hole and the floor through hole.

12. The vehicle according to claim 11, wherein the through hole and the floor through hole are overlapped when viewed in the height direction.

13. The vehicle according to claim 10,
wherein the high-voltage device is disposed in a recess provided in a floor panel, and
wherein the high-voltage device and the power converter are arranged so as to overlap when viewed from the front-rear direction.

14. The vehicle according to claim 10, wherein the high-voltage device is air-cooled, and the power converter is water-cooled.

15. The vehicle according to claim 14, further comprising:
a voltage converter that performs voltage conversion for supplying the electric power of the high-voltage device to an auxiliary device or a low-voltage device,
wherein the voltage converter is disposed outside the vehicle cabin together with the power converter, and
wherein the voltage converter is water-cooled together with the power converter.

16. The vehicle according to claim 15, wherein the power converter and the voltage converter are disposed in a housing.

* * * * *